United States Patent
Combe

(10) Patent No.: US 9,932,152 B2
(45) Date of Patent: Apr. 3, 2018

(54) METAL CANS WITH PEELABLE LIDS

(71) Applicant: Crown Packaging Technology, Inc., Alsip, IL (US)

(72) Inventor: Florian Christian Gregory Combe, Oxfordshire (GB)

(73) Assignee: Crown Packaging Technology, Inc., Alsip, IL (US)

( * ) Notice: Subject to any disclaimer, the term of this patent is extended or adjusted under 35 U.S.C. 154(b) by 425 days.

(21) Appl. No.: 14/421,460

(22) PCT Filed: Aug. 6, 2013

(86) PCT No.: PCT/GB2013/052093
§ 371 (c)(1),
(2) Date: Feb. 13, 2015

(87) PCT Pub. No.: WO2014/027180
PCT Pub. Date: Feb. 20, 2014

(65) Prior Publication Data
US 2015/0217907 A1  Aug. 6, 2015

(30) Foreign Application Priority Data
Aug. 17, 2012 (GB) .................................. 1214716.1

(51) Int. Cl.
*B65D 17/50* (2006.01)
*B29C 65/00* (2006.01)
(Continued)

(52) U.S. Cl.
CPC .......... *B65D 43/0233* (2013.01); *B32B 37/18* (2013.01); *B32B 38/0012* (2013.01);
(Continued)

(58) Field of Classification Search
CPC .. B65D 17/501; B65D 17/502; B65D 17/503; B65D 43/021; B65D 43/0206; B65D 2517/5027; B65D 2517/5029; B65D 2517/5032; B65D 2517/5035; B65D 2517/5083; B32B 2435/00; B32B 2435/02; B29C 66/53461; B29C 66/53462; B29C 66/81417
(Continued)

(56) References Cited

U.S. PATENT DOCUMENTS

| 2009/0022861 A1 | 1/2009 | Caunter et al. |
| 2010/0301045 A1* | 12/2010 | Docrot ................. B65D 17/502 220/254.1 |
| 2011/0272417 A1 | 11/2011 | Holstine et al. |

FOREIGN PATENT DOCUMENTS

| DE | 2718574 A1 | 11/1978 |
| EP | 1800770 A1 | 6/2007 |

(Continued)

*Primary Examiner* — Carson Gross
(74) *Attorney, Agent, or Firm* — Baker & Hostetler LLP

(57) ABSTRACT

A method of sealing a peelable lid to a circumferential and inwardly projecting flange formed in a tubular metal can body, where the flange has a sealing surface having a substantially V-shaped profile. The method comprises pressing the peelable lid against the sealing surface of the flange using a punch, an engagement surface of the punch having a generally V-shaped profile such that the apex of the punch presses the peelable lid into the valley of the engagement surface of the flange.

4 Claims, 4 Drawing Sheets

(51) Int. Cl.
  *B65D 43/02* (2006.01)
  *B65B 7/28* (2006.01)
  *B32B 37/18* (2006.01)
  *B32B 38/00* (2006.01)
  *B65D 1/12* (2006.01)
  *B65D 1/40* (2006.01)
  *B29L 31/00* (2006.01)
  *B29C 65/18* (2006.01)
  *B29C 65/76* (2006.01)

(52) U.S. Cl.
  CPC .............. *B65B 7/2878* (2013.01); *B65D 1/12* (2013.01); *B65D 1/40* (2013.01); *B65D 17/503* (2013.01); *B29C 65/18* (2013.01); *B29C 65/76* (2013.01); *B29C 66/112* (2013.01); *B29C 66/131* (2013.01); *B29C 66/24221* (2013.01); *B29C 66/53461* (2013.01); *B29C 66/723* (2013.01); *B29C 66/742* (2013.01); *B29C 66/81417* (2013.01); *B29C 66/8322* (2013.01); *B29L 2031/717* (2013.01); *B32B 2435/02* (2013.01); *B65D 2543/00425* (2013.01)

(58) Field of Classification Search
  USPC .......................................... 156/69; 220/265
  See application file for complete search history.

(56) References Cited

FOREIGN PATENT DOCUMENTS

| | | | |
|---|---|---|---|
| FR | 1544071 | 10/1968 | |
| FR | 2639561 | 6/1990 | |
| GB | 1376207 A | * 12/1974 | ........... B29C 65/568 |

* cited by examiner ns with peelable lids# METAL CANS WITH PEELABLE LIDS

CROSS-REFERENCE TO RELATED APPLICATIONS

This application is the National Stage of International Application No. PCT/GB2013/052093, filed Aug. 6, 2013, which claims the benefit of United Kingdom application number 1214716.1, filed Aug. 17, 2012, the disclosures of which are incorporated herein by reference in their entirety.

TECHNICAL FIELD

The present invention relates to metal cans with peelable lids and in particular to the provision of a metal can having a flange to provide a surface for sealing the can with a peelable lid.

BACKGROUND

Cans are typically either two-piece or three-piece cans. In the case of a two-piece can, a can body is formed by punching a metal plate to form a cylinder closed at one end. Once the can is filled, the open end is then typically closed by seaming a lid to the can body. In the case of a three-piece can, a can body, open at both ends, is formed by rolling and seaming a metal plate. A first end is closed by typically seaming a lid to the can body. Once the can is filled and the second end is closed by typically seaming a lid to the can body.

FR 2639561 discloses a metal can and a method of manufacturing the same, the metal can comprising an internal annular flange to which a peelable lid can be heat-sealed in order to hermetically seal an interior space of the can. The peelable lid has a heat sealable layer which is used to hermetically bond the lid to the flange. An alternative heat sealing approach could involve providing adhesive around the upper surface of the flange and/or around the under surface of the peelable lid, heating the flange and applying downward pressure.

For some markets, the type of metal can described in FR 2639561 may be perfectly adequate. However, for more specialised markets, for example the infant formula market (i.e. metal cans that are used to store baby milk powder), where the seals are required to have very high performances even in the most hostile of environments, these known cans may not be suitable.

Before being introduced into the market, such specialised metal cans are required to undergo a series of stringent tests to ensure that they meet the necessary safety requirements. For example, metal cans may be tested to ensure that they do not lose their hermetic seal even when stored at high ambient temperatures such as 45° C. for periods in excess of 3 months and with a pressure difference from inside to outside of the can, for example of 700 mbar (70 kPa). Typically the external pressure is standard (ambient) air pressure and the internal pressure is negative, often referred to as a "vacuum". Under such conditions, it has been found that metal cans made in accordance with those described in the prior art are prone to suffering from "creep" in the seal. Creep is the tendency for the peelable lid to be pulled inward across the flange. This can reduce the effectiveness of the seal between the peelable lid and the flange, and in some cases may cause the seal to fail completely. Metal cans that suffer from creep in this way cannot be used in the infant formula market as the seal is not deemed to seal the product to a high enough standard.

SUMMARY OF INVENTION

It is an object of the present invention to overcome or at least mitigate the problems discussed above which result from creep in the seal between a metal can with a flange and a peelable lid.

According to a first embodiment of the present invention there is provided a method of sealing a peelable lid to a circumferential and inwardly projecting flange formed in a tubular metal can body, where the flange has a sealing surface having a substantially V-shaped profile, the method comprising pressing the peelable lid against the sealing surface of the flange using a punch, an engagement surface of the punch having a generally V-shaped profile such that the apex of the punch presses the peelable lid into the valley of the engagement surface of the flange.

Heat may be applied to the peelable lid and/or the flange as the peelable lid is pressed against the sealing surface of the flange.

Embodiments of the present invention provide an improved metal can that is capable of providing a superior hermetic seal.

Preferably, said step of pressing the peelable lid against the sealing surface of the flange using a punch substantially eliminates air pockets from between the peelable lid and the sealing surface of the flange.

DESCRIPTION OF EMBODIMENTS

The following discussion relates to metal cans that are provided with peelable lids that hermetically seal the can, and which can be peeled back and removed to open the can and provide access to the contents stored therein. The metal cans may be either two-piece cans or three-piece cans.

As discussed above, known metal cans that are provided with flanges to seal with a peelable lid are often not able to be sealed to a high enough standard to pass the stringent tests required for certain high specification products, in particular infant formula powder.

Figure 1:
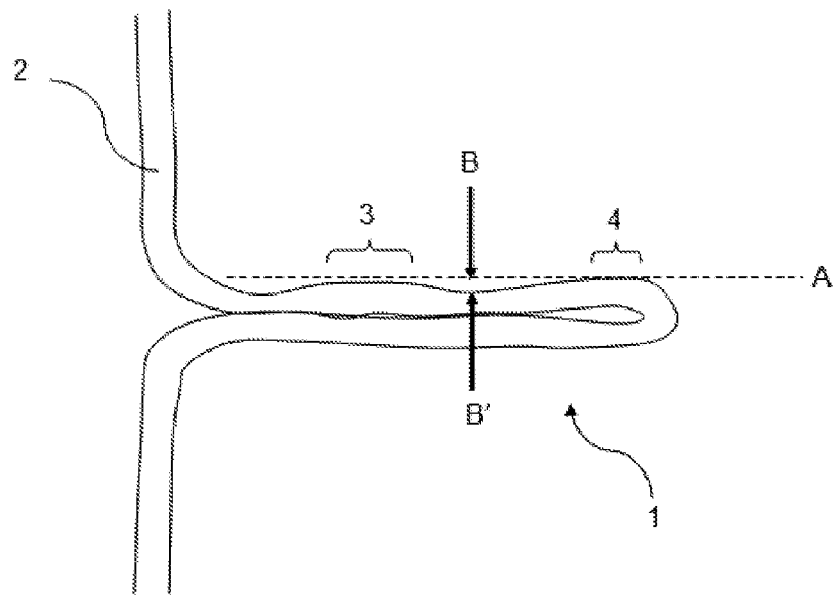
FIG. 1 illustrates a cross section through part of the side wall of a can with a flange as currently known in the prior art.

FIG. 1 illustrates a cross section through part of the side wall 2 of a metal can that has a flange 1 such as is known in the prior art. The upper surface of the flange does not provide a perfectly flat surface onto which a peelable lid can be sealed. Tests show that it is extremely difficult to obtain a completely flat upper surface on this type of flange, and typically the upper surface of the flange adopts a generally "V-shaped" profile with two radially inner and outer portions (3 and 4) being raised above an area between them at a lower level (B'). This profile arises when the initially dome shaped upper surface of the flange collapse down in the centre region (N and B').

The horizontal dotted line A indicates that, during a typical sealing process, when a peelable lid is positioned onto the upper surface of the flange from above using a flat punch, it would in fact only seal to the upper surface of the flange at the positions 3 and 4. There is a significant "trough" between arrows B and B' where air would be trapped between the two sealed portions at 3 and 4, thus preventing this area from being properly sealed. As a consequence, there is a substantial reduction in the overall sealing area between the peelable lid and the flange, and this greatly weakens the seal in shear mode and increases the possibility of the seal suffering from creep.

Figure 3:
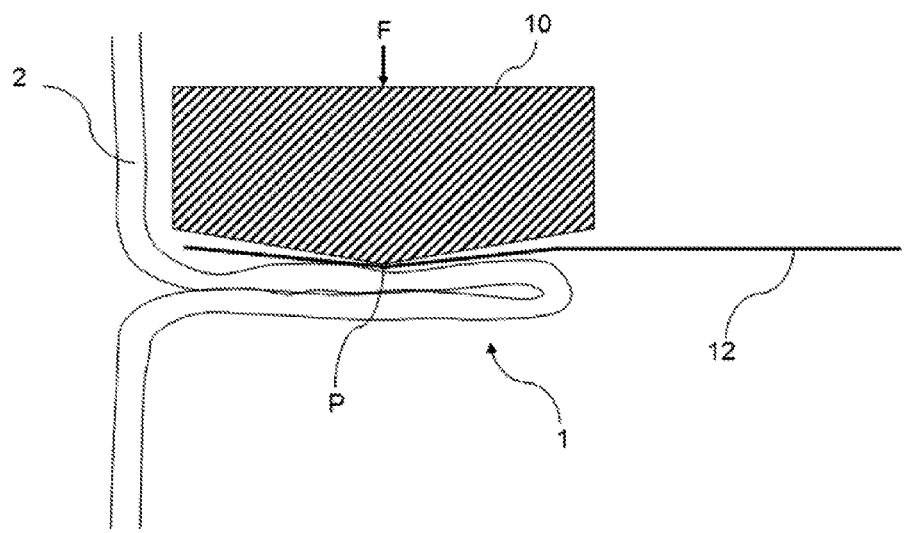
FIG. 3 illustrates the sealing operation at a second stage.

A method of sealing a peelable lid to a metal can comprising an inwardly projecting flange will now be described, with reference to FIGS. 3 to 5, and which enables the formation of a substantially continuous seal across the radial extent of the flange in order to achieve a more robust seal. This is facilitated by using a punch that has an engagement surface having a generally V-shaped profile to press the peelable lid against the flange sealing surface. The generally V-shaped engagement surface of the punch reduces the size of, or even eliminates, "pockets" of trapped air between the peelable lid and the upper surface of the flange.

Figure 2:
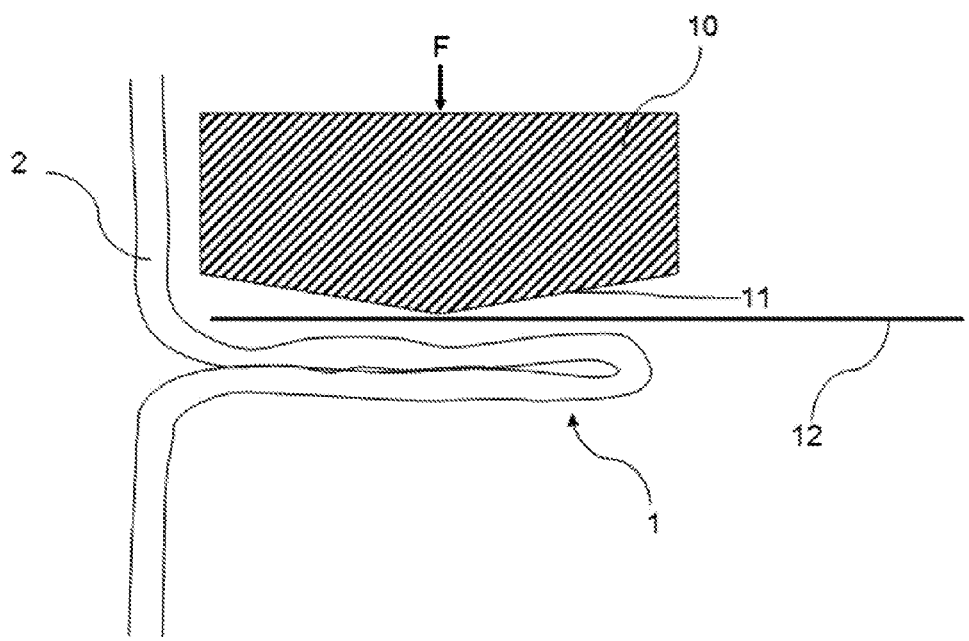
FIG. 2 illustrates a cross section through part of the side wall and a punch with a generally V-shaped engagement surface at a first stage of a sealing operation according to an embodiment of the present invention.

FIG. 2 illustrates in cross section a part of the side wall 2 of a metal can and a punch 10 at the start of a sealing operation in which the peelable lid 12 is "punched" into place. The punch 10 has a generally V-shaped engagement surface 11 which approximately conforms with the generally V-shaped profile of the sealing surface of the flange 1. [It will be appreciated that the punch 10 is generally ring shaped for insertion into the can body such that in use it extends around the inner periphery of the can body for engagement with the flange.]

During the heat sealing process, the punch 10 presses the peelable lid 12 down on the flange 1 using a force F. The seal is formed initially in the middle of the radial extent of the flange 1 at point P where the apex of the punch 10 presses the peelable lid 12 into the trough of the engagement surface of the flange 1. Then, as shown in FIG. 3, as the punch is pressed down onto the flange, the peelable lid 12 adopts the V-shaped profile of the punch 10, and a seal is formed between the peelable lid 12 and the flange 1.

The seal is made using a heat-sealable material, for example a thermoplastic material, located between the peelable lid and the convex upper surface of the flange. The V-shaped profile of the engagement surface of the punch 10 allows any air that would otherwise be trapped, to escape from between the peelable lid and the sealing surface of the flange at each of the sides before the full seal is made across substantially the whole radial extent of the flange.

Figure 4:
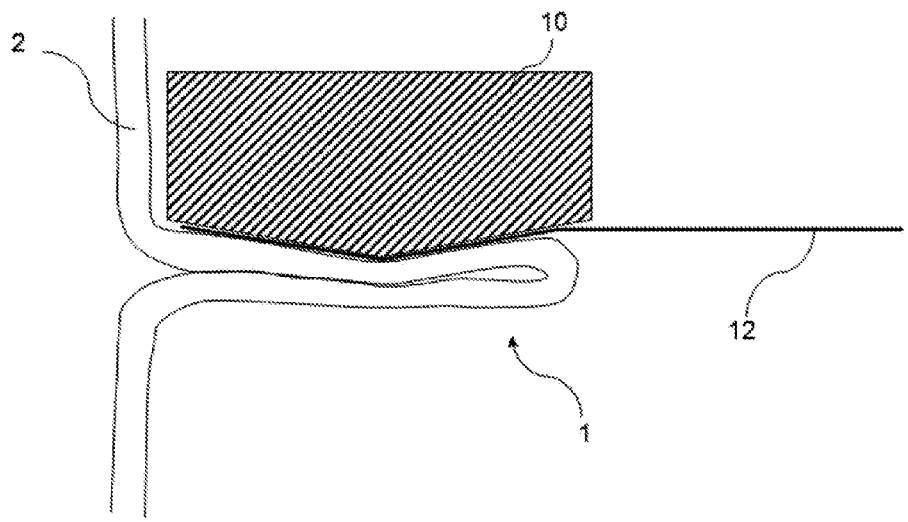
FIG. 4 illustrates the sealing operation at a third stage.

As illustrated in FIG. 4, the shape of the sealing surface of the flange may also be changed by the pressure applied by the punch 10. This can further reduce the extent of the non-sealed areas between the peelable lid and the sealing surface of the flange.

Figure 5:
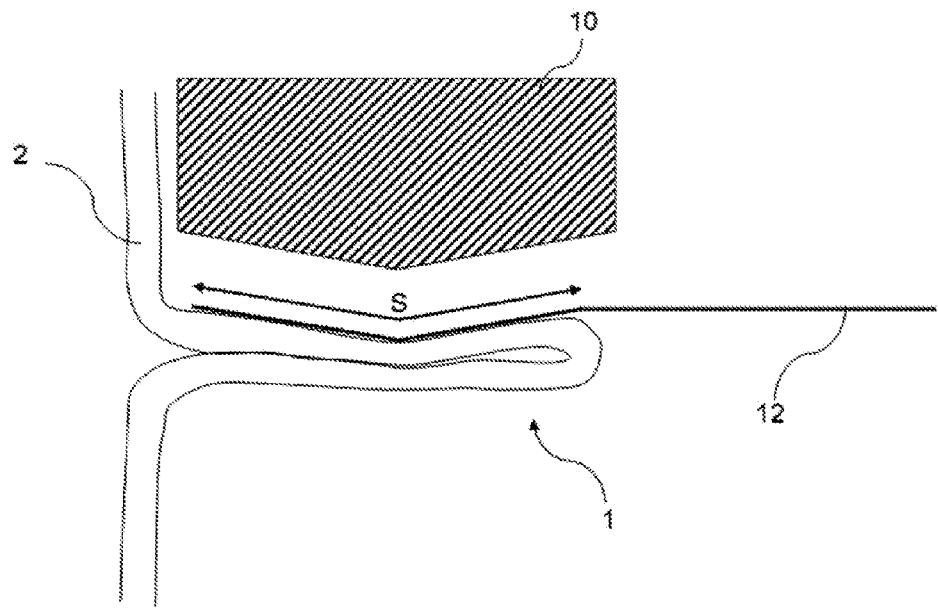
FIG. 5 illustrates the sealing operation at a fourth stage.

FIG. 5 illustrates a cross section of the wall of the metal can 2 after the peelable lid 12 has been heat-sealed to the sealing surface of the flange 1 and the punch 10 withdrawn. The arrow S shows the substantially uninterrupted width of the seal that is formed over most of the radial extent of the flange.

Figure 6:
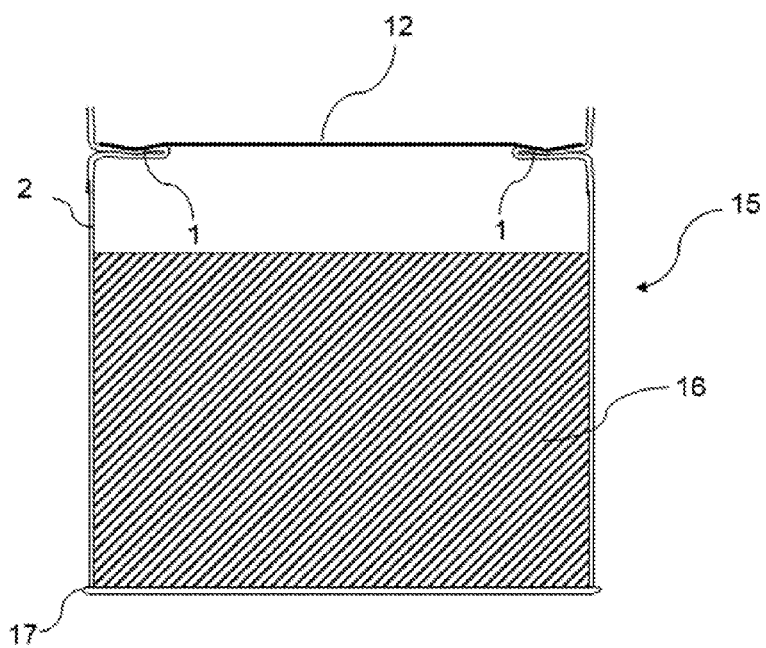
FIG. 6 illustrates a cross-sectional view of a metal can body with a flange and a peelable lid sealed to the flange using the method of FIGS. 2 to 5.

FIG. 6 illustrates a cross section through a metal can 15 storing a powder 16. The metal can has a flange 1 formed in the can wall 2. The flange 1 provides a sealing surface to which a peelable lid 12 has been heat sealed using a punch having an engagement surface with a generally V-shaped profile. The peelable lid 12 can comprise a tab, or similar, such that the consumer can more easily remove the peelable lid by peeling it off the flange. The can is provided with a non-removable base, or "can bottom", 17 which seals the opening at the bottom end of the can. Although not shown in FIG. 6, the can may further be provided with a removable plastic overcap that is placed over the opening at the top end of the can. This plastic overcap enables the can to be reclosed once the seal has been broken and the peelable lid removed.

The flange 1 is shown in FIG. 6 as being near the open end of the metal can. However the flange may be formed lower down the can wall, thus enabling the seal to separate the can into two distinct compartments. For example, the lower compartment that is hermetically sealed by the peelable lid may contain infant formula powder, and the upper compartment may contain a scoop or spoon. A further flange may be provided towards the top of the can to seal the section of the can containing the scoop to ensure that it is kept in a sterile environment prior to a consumer opening and using it.

It is also possible to form flanges at both open ends of a tubular can body (which has a welded side seam) and to close both ends with respective peelable lids.

During the manufacturing process for cans such as those described herein, a can manufacturer may manufacture tubular metal cans with the peelable lids in place but with the bottom ends left open. The cans, with separate bottom ends and plastic overcaps, will then be sent to the manufacturer's customers. The customer can then fill the cans with product through the open bottoms before sealing the cans by seaming the non-removable can bottoms in place. The plastic overcaps can then be placed on the top end of the cans above the peelable lids. If required, a spoon or scoop can be placed in the can on top of the peelable lid, prior to the plastic overcap being put in place.

Figure 7:
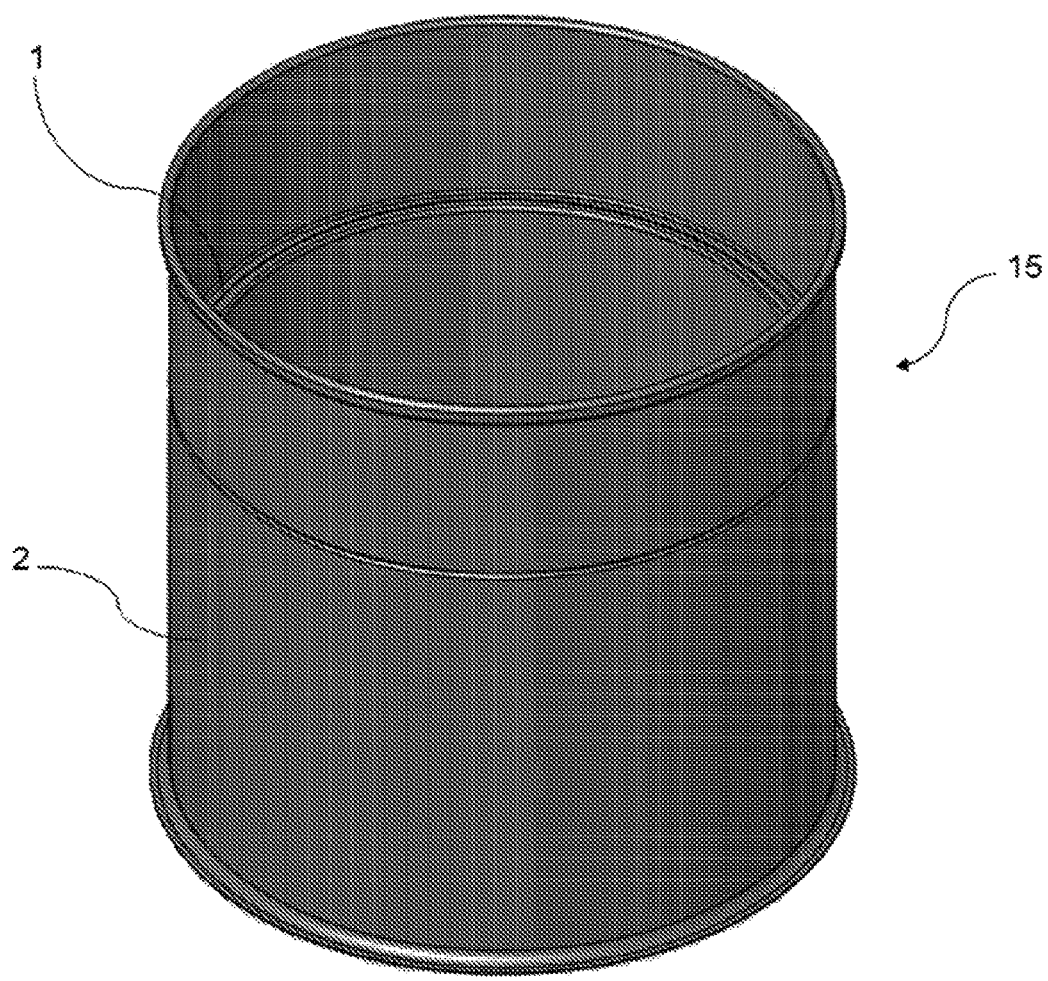
FIG. 7 is a perspective view of a metal can body according to an embodiment of the invention.

FIG. 7 illustrates a perspective view of a metal can 15 from above. This view shows that the flange 1 is formed in the can wall 2 part-way down its length, and that the flange extends around the entire inner circumference of the metal can 15.

It will be appreciated by the person of skill in the art that various modifications may be made to the above described embodiments without departing from the scope of the present invention. For example, the peelable lid may be of a plastic material, or may be a multi-layer structure which includes a ceramic layer such as silica or alumina instead of metal.

The invention claimed is:

1. A method of sealing a peelable lid to a circumferential and inwardly projecting flange formed in a tubular metal can body, comprising the steps of:
   (i) forming a V-shaped profile into a sealing surface of the flange; and
   (ii) after forming the V-shaped profile, engaging a V-shaped engagement profile of a punch with the peelable lid to press the peelable lid against the flange such that an apex of the punch engagement profile presses the peelable lid into a valley of the flange profile.

2. A method according to claim 1, further comprising the step of applying heat to at least one of the peelable lid and the flange as the peelable lid is pressed against the flange.

3. A method according to claim 1, wherein said step of pressing the peelable lid against the sealing surface of the flange using a punch substantially diminishes air pockets from between the peelable lid and the sealing surface of the flange.

4. A method according to claim 3, wherein the step of pressing the peelable lid against the sealing surface of the flange using a punch substantially eliminates air pockets from between the peelable lid and the sealing surface of the flange.

\* \* \* \* \*